US012579903B1

(12) United States Patent
Rowland, III et al.

(10) Patent No.: US 12,579,903 B1
(45) Date of Patent: Mar. 17, 2026

(54) RADAR MEASUREMENT VIA CHARACTERIZATION

(71) Applicants: Henry Thomas Rowland, III, Fredericksburg, VA (US); Jill Marie Ellington, Fredericksburg, VA (US); Denis Hugh McCabe, Fredericksburg, VA (US)

(72) Inventors: Henry Thomas Rowland, III, Fredericksburg, VA (US); Jill Marie Ellington, Fredericksburg, VA (US); Denis Hugh McCabe, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 351 days.

(21) Appl. No.: 18/515,110

(22) Filed: Nov. 20, 2023

(51) Int. Cl.
  *G09B 9/54* (2006.01)
  *G01S 7/40* (2006.01)

(52) U.S. Cl.
  CPC ................. *G09B 9/54* (2013.01); *G01S 7/40* (2013.01); *G01S 7/4052* (2013.01); *G01S 7/406* (2021.05)

(58) Field of Classification Search
  CPC ... G09B 9/54; G01S 7/282; G01S 7/40; G01S 7/4052; G01S 7/4056; G01S 7/4065; G01S 7/4069; G01S 7/4073; G01S 7/4091
  See application file for complete search history.

(56) References Cited

U.S. PATENT DOCUMENTS

| | | | | |
|---|---|---|---|---|
| 4,730,191 | A * | 3/1988 | Groebke ................. | G09B 9/54 434/2 |
| 5,431,568 | A * | 7/1995 | Fey .......................... | G09B 9/54 342/174 |
| 5,457,463 | A * | 10/1995 | Vencel ..................... | G09B 9/54 342/170 |
| 7,030,809 | B2 | 4/2006 | McCabe et al. .............. | 342/195 |
| 7,145,504 | B1 * | 12/2006 | Newberg .............. | G01S 7/4052 342/195 |
| 7,327,308 | B2 * | 2/2008 | Cheng ................... | G01S 7/4056 342/178 |
| 7,852,260 | B2 * | 12/2010 | Sarafian ................... | G09B 9/54 342/165 |
| 8,334,803 | B1 * | 12/2012 | Urkowitz .............. | G01S 7/4052 342/168 |
| 8,604,965 | B2 * | 12/2013 | Jennings .............. | G01S 7/4004 342/36 |

(Continued)

OTHER PUBLICATIONS

G. E. P. Box et al., "A Note on the Generation of Random Normal Deviates", Ann. Math. Statis. 29(2), Jun. 1958. https://projecteuclid.org/journals/annals-of-mathematical-statistics/volume-29/issue-2/A-Note-on-the-Generation-of-Random-Normal-Deviates/10.1214/aoms/1177706645.full.

(Continued)

*Primary Examiner* — Timothy A Musselman
(74) *Attorney, Agent, or Firm* — Gerhard W. Thielman

(57) ABSTRACT

A computer-implemented radar simulation method is provided for directing a radar beam to a target. The method includes receiving target position from the target; computing target coordinates in a select frame of reference; inserting random noise error into the target coordinates as accuracy degradation to represent at least one radar performance characteristic; providing the accuracy degradation into the frame of reference; and directing the radar beam by the accuracy degradation towards the target.

18 Claims, 5 Drawing Sheets

(56)  References Cited

U.S. PATENT DOCUMENTS

| | | | |
|---|---|---|---|
| 10,254,393 B2 | 4/2019 | McCabe ............... | G01S 13/273 |
| 11,740,326 B2 * | 8/2023 | Chritton ............... | G01S 7/4021 |
| | | | 342/171 |
| 2019/0137603 A1 * | 5/2019 | Peacock ............... | G01S 7/4052 |
| 2021/0373122 A1 * | 12/2021 | Hamberger ........... | G01S 7/4026 |
| 2021/0406722 A1 * | 12/2021 | Armstrong-Crews ....................... | |
| | | | G06N 3/094 |

OTHER PUBLICATIONS

Y. Bar-Shalom et al., Estimation with Applications to Tracking and Navigation, John Wiley 2001, ch. 12 https://annas-archive.org/scidb/ 10.1002/0471221279.ch12?scidb_verified=1.

* cited by examiner

500

GPS ground truth position determined for Target sent to Computational Facility — 510

CF computes Target coordinates in reference frame of cued radar — 520

CF inserts error values to simulate random noise of search radar — 530

Generating noisy cues based on random noise in reference frame — 540

Noisy cues direct beam of cued radar beam towards Target — 550

RADAR MEASUREMENT VIA CHARACTERIZATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to radar simulation by using radar characteristics in order to conduct tracking performance evaluation without a physical radar. In particular, this invention relates to providing error characteristics to a cued radar by more accurately simulating directionality and distance measurements of search radars.

Search (or surveillance) radars track and locate targets. For search radar designs, vehicle detection typically outweighs tracking location accuracy. These search radars comprise two basic types: rotator and phased array. The rotator radar physically rotates its antenna around in a 360° circle, such as is often observed at an airport or on a commercial ship.

Conversely, the phased array radar mounts its planar antenna along a platform side, and thus remains stationary in relation to the platform. A phased array scans its search beam electronically using complex electronic phase shifters. For a platform to operate with full 360° scan coverage, a series of phased arrays are positioned at select lateral angles with respect to the longitudinal axis of the platform. The phased array was developed later than the rotator and is replacing the rotators due to its vastly superior scan and surveillance capabilities. Both varieties of search radars employ a wide beam width which lends itself to 360°-wide area surveillance.

A fire-control (FC) radar presents a distinctly different type with a separate purpose and functionality. The FC radar is also known as a weapon-control-system (WCS) radar. The FC or WCS radar has a special purpose such as fire control for aiming guns and as such requires a narrower beam width than search radars. The narrow beam enables the FC radar to home in on the specific target for engagement. Typically, the FC radar must be cued to a small volume surrounding the target for expedient acquisition, and to subsequently track that target until the engagement process is completed.

The conventional method of testing the tracking performance metrics of a specific radar involves collecting active target data at the facility where the physical radar system is installed. There are many industry and government applications that interact with radar data, but for whom the burden of buying and operating actual physical radar systems constitutes excessive burdens. This reduces their ability to conduct assessments that could lead to more effective, lower cost product designs.

SUMMARY

Conventional radar cuing techniques requiring physical radars yield disadvantages addressed by various exemplary embodiments of the present invention. These exemplary embodiments provide a computer-implemented radar cuing technique for directing a radar beam to a target. This computer-implemented radar simulation technique provides radar-representative measurement data tracking active targets in real-time based on radar statistical performance specifications for accuracy, data rate and other operating characteristics.

The technique includes receiving target position from the target; computing target coordinates in a select frame of reference; inserting random noise error into the target coordinates as accuracy degradation to represent at least one radar performance characteristic of a simulated radar; providing the accuracy degradation into the frame of reference; and directing the radar beam using the accuracy degradation towards the target.

The target position employs ideal ground truth, such as from satellite reception. The target position is converted to a frame of reference and noise for simulating characteristics of a detecting search radar are introduced to simulate measurements from the selected search radar to be evaluated.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
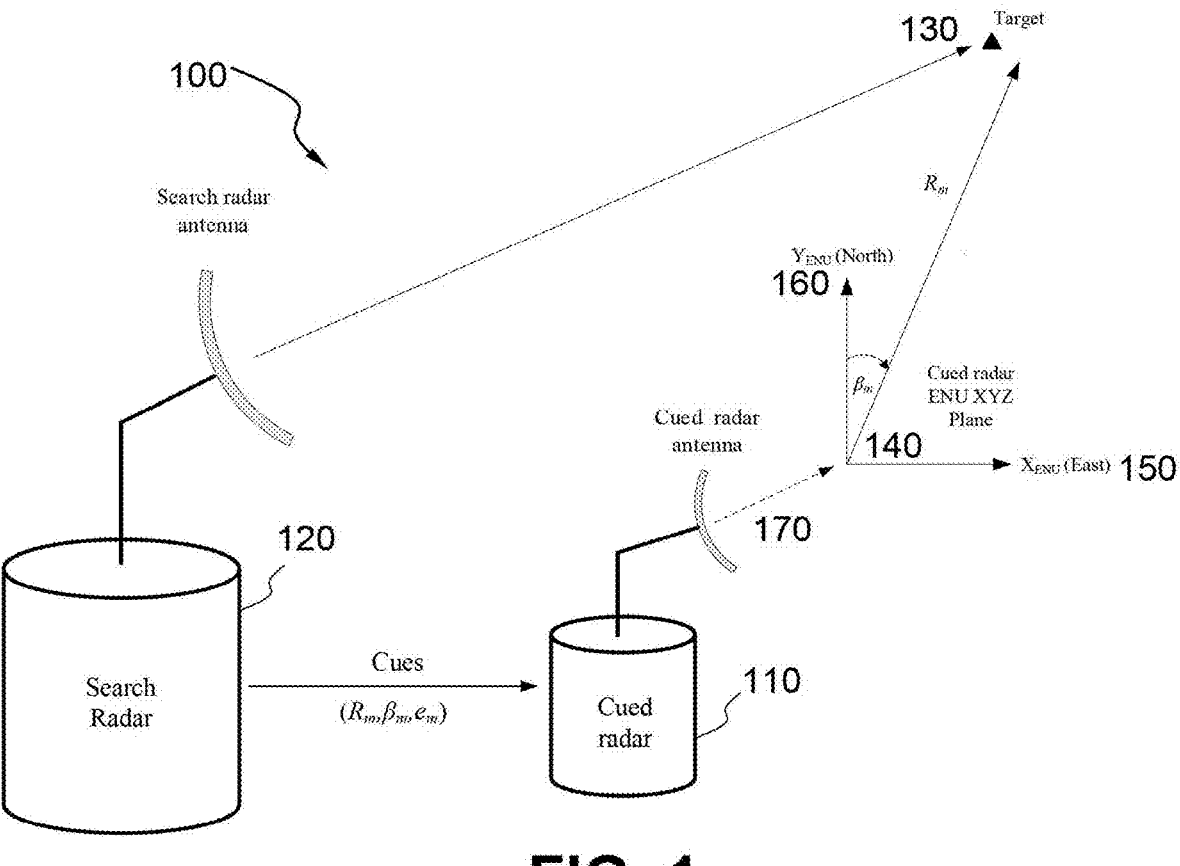
FIG. 1 is a diagram view of search and cued radars for searching a target.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component. Communication can be conducted via internet protocol (IP).

The disclosure generally employs quantity units with the following abbreviations: length in meters (m), mass in grams (g), time in seconds(s), angles in degrees (°, force in newtons (N), temperature in kelvins (K), energy in joules (J), and frequencies in gigahertz (GHz). Supplemental measures can be derived from these, such as density in grams-per-cubic-centimeters ($g/cm^3$), moment of inertia in gram-square-centimeters ($kg-m^2$) and the like.

Section I: Introduction—This disclosure presents a technique to generate measurements to represent radar equipment without the need for the physical radar under evaluation. This involves collaboration between search and fire control (FC) radars, as well as enabling simulation evaluation. The FC radar must be cued due to its lack of the search radar's encompassing surveillance capability. Exemplary embodiments enable and augment this cueing function of the FC radar by the search radar, although this capability is not limiting. Such embodiments can operate with both rotator and phased array designs.

Exemplary embodiments provide a physical radar with active target driven measurement cueing data from multiple, simulated search radars each capable of making measurements with some inherent accuracy. In the instance that prompted development of the embodiments described herein, there was no single location where all necessary search radars are installed, necessitating the unattainable option of moving equipment, personnel, computational and data resources as well as the target to multiple locations. Further, the conventional manner to evaluate a proposed radar design involves constructing a prototype. Funding limitations preclude such wholesale physical prototype development to examine a wide range of possible radar system design solutions.

FIG. 1 shows a diagram view 100 of a conventional scenario that involves associated generic radars. A receiver radar 110 to be cued, e.g., fire control or FC, operates in conjunction with a search radar 120 to engage an aerial target 130. View 100 graphically describes the search radar 120 tracking the target 130 and supplying its coordinates to the cued radar 110 to direct its narrow beam.

A two-dimensional ENU plane 140 serves as coordinate reference for the cued radar 110, based on directions East 150 and North 160, shown as a projection 170. (The Up axis is omitted for clarity.) The radar 110 centers its radar beam search pattern for target 130 based on measurements of radial distance, bearing angle and elevation angle (omitted) derived from the search radar 120 from the origin of the plane 140 to the target 130.

Figures 2, 3:
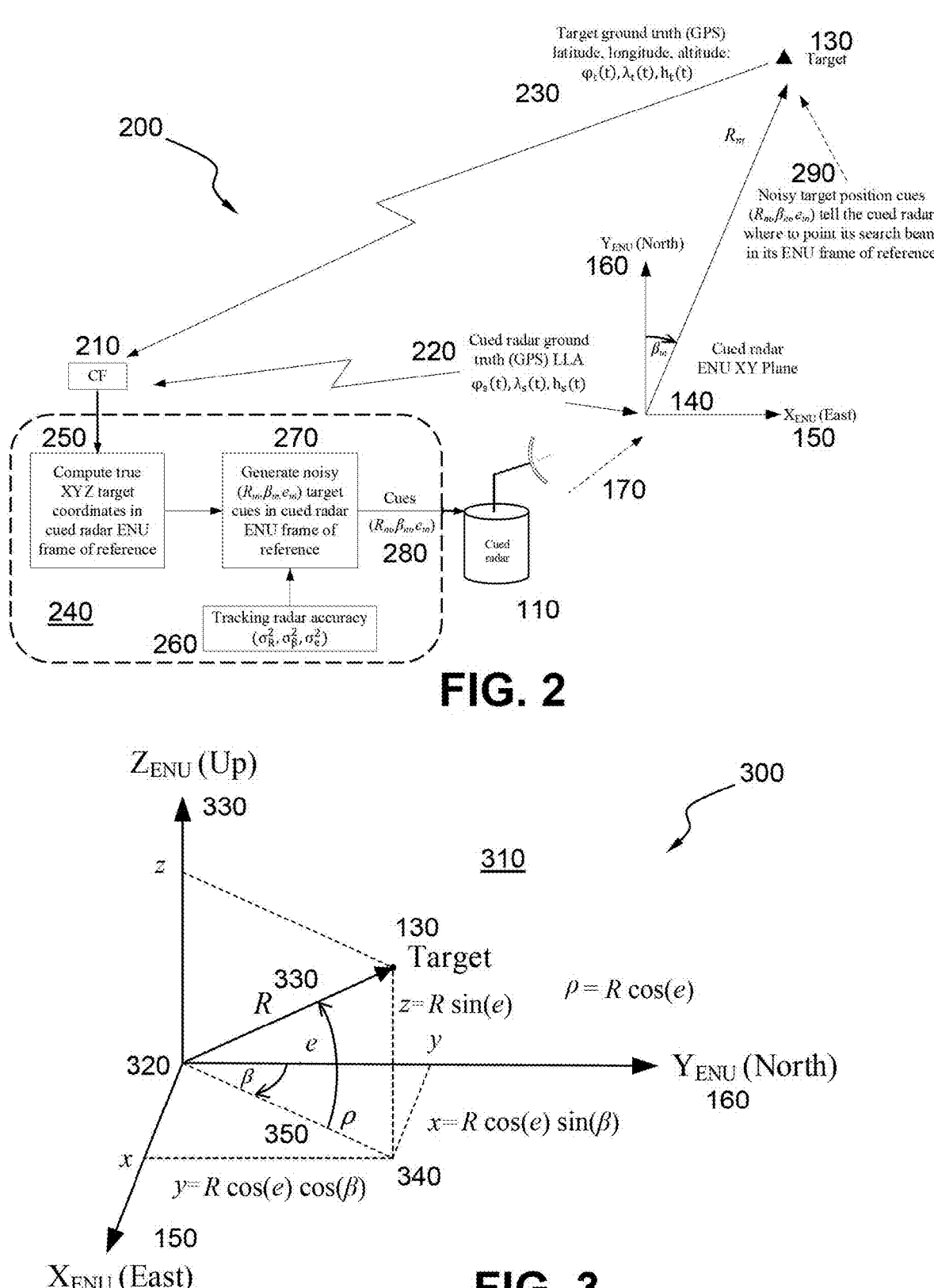
FIG. 2 is a diagram view of the cued radar and associated computational assets for directing towards the target.
FIG. 3 is a geometric view of a three-dimensional frame.

FIG. 2 shows a diagram view 200 of an exemplary process for generating noisy ENU XYZ cueing data. The search radar 120 is absent from view 200, being replaced by the exemplary simulation technique. Absent the search radar 120, the cued radar 110 operates with a central computational facility (CF) 210. The cued radar 110 provides its ground truth position information 220 to the CF 210. The active test target 130 also provides ground truth information 230 received by the CF 210.

Both positions 220 and 230 include latitude, longitude and altitude based on global positioning system (GPS) or alternative navigational sources as geodetic coordinates. Time can be synchronized between all elements to universal time, coordinated (UTC). To replace the search radar 120, a radar simulation system 240 (shown within a dash envelope) comprises a coordinate computation block 250, an accuracy simulation data structure 260 and a noise generation block 270 that supplies cuing information 280 to the cued radar 110. The noise generation block 270 produces three quantities ($\varepsilon_R$, $\varepsilon_\beta$, $\varepsilon_e$) that denote the Gaussian random errors in range, bearing and elevation measurements that are always present in actual radar measurements. These random errors constitute accuracy degradation intended to be representative of the radar's characteristic performance.

The resulting noisy measurements 280 in the cued radar's frame of reference 140 are supplied as degraded positions 290 to the cued radar 110. Exemplary embodiments can optionally incorporate a graphical user interface (GUI) used to enable operator selection of the radar types to simulate, the systems of coordinates to incorporate, the data rates and other similar performance attributes. This can easily be expanded to enable entry of multiple subscribers for radar data and other properties. Similarly, an application interface can be developed for automated processes that interact with exemplary embodiments.

The CF 210 performs calculations in the coordinate computation block 250. The search radar's tracking accuracy information is separately provided as variance data in the data structure 260 based on performance characteristics of the search radar 120 under test simulation. Such characteristics are based on measurement variances, as well as gain and beam shape. The noise generator block 270 receives input from both sources for introducing random noise to the target's position parameters as cues 280 provided to the cued radar 110, which then points a search beam to the target 130 as a range measurement ($R_m$), a bearing angle measurement ($\beta_m$) and an elevation angle ($e_m$) omitted in view 200.

To avoid any confusion, in the following discussion this disclosure refers to the radars as either cued radar 110 or search radar 120. No search radar 120 has been present at the facility during simulation. Cueing errors can incorporate as many characteristics of each search radar 120 as are available.

The search radar 120 can be represented as the radar simulation system 240 and so can be representative of a configuration to be tested without being physically present for testing participation. Similarly, any radar or a plurality of radars of various types can be simulated to provide representative measurement data while tracking active targets 130 in order to access their tracking performance.

The intent of cueing is to direct the FC radar 110 to a sufficiently small volume in the vicinity of the target 130 to enable detection and acquisition for accurate tracking and engagement. The critically important live data collection experiment for exemplary embodiments enables performance determination of the physical FC radar 110 in acquiring the target 130 in its field-of-view and subsequently tracks that target 130 using received cues 290 of noisy position measurements 280 generated from simulated search radars 120 to transform ideal GPS corrected target position signals 230.

Radar search simulation necessitates establishing the actual position of the active target 130, detection of which can be affected by radar configuration, gain and range. To provide input to the radar simulation computation, this target 130 has an onboard Global Navigation Satellite System (GNSS) receiver (of which GPS represents an example) using a local correction service that provides a continuous, real-time, high-accuracy digital stream of its time-tagged position in global coordinates (latitude, longitude, altitude) to the CF 210 using communications equipment. The cued radar 110 may employ either a surveyed position, or an onboard GNSS receiver, which also provides constant high-accuracy readout of its position in global coordinates to the central CF 210.

Section II: Simulation—Frequently, comparison of search radars 120 against a specific-type target 130 becomes desirable or necessary for different applications, such as assessing cueing performance for an FC radar 110. Because different search radars 120 have particular characteristics and capabilities, a given radar may provide excellent tracking for one type of target 130, but yield poor tracking performance for another type of target 130. Such comparison evaluation can be time consuming and expensive or else logistically unfeasible. Such infeasibility includes acquisition and transport of either the particular search radar 120 or the FC radar 110 stationed at various locations, along with targets, personnel and other supporting equipment.

Exemplary embodiments describe an innovative process for live radar data collection and tracking performance testing of a physical moving target 130 in three-dimensional (3D) space using data with measurement characteristics from radars that may be absent from the test site. Such embodiments enable testing to be conducted at a single location even though the testing involves multiple radars, several of which may be resident only at different facilities, or those situations involving a radar that cannot be easily obtained such as a competitor's (or adversary's) system, or finally situations that involve evaluating proposed radars not yet in existence. These include multiple steps involved in implementing this process as are now set forth.

To provide the ideal target position data needed as the basis for the simulation process GNSS receivers with position correction service are installed on all targets and other physical systems involved in the testing. In the instance currently described, both the moving target 130 and the cued radar 110 are thus instrumented. These receivers provide a continuous stream of precise geodetic coordinates of the position of each platform. These coordinates 230 and 220 are broadcast back to the CF 210 in real-time by one of many modern radio technologies.

These geodetic coordinates include latitude ($\varphi$), longitude ($\lambda$), and altitude (h) and are continuously transmitted to the CF 210. Readouts of the precise geodetic locations of both the target 130 and of the cued radar 110 are available at a high data rate. The key processes and data used within CF 210 are subdivided into three blocks of the simulation system 240: coordinate computation 250, radar accuracy data structure 260 and noise generation 270.

Using the two sets of GNSS geodetic coordinates, the computation block 250 computes the true X Y Z target coordinates in the stabilized East-North-Up (ENU) frame of reference attached to the cued radar 110. The ground truth XYZ coordinates of the target 130 are provided in the cued radar's ENU frame of reference 140. These target coordinates are the same as those that would be produced by a surveillance radar 120 with the ability to perform ideal measurements. Note that in the more general situation, the frame of reference can be any required for the particular circumstance.

The noise generation block 270 converts the 3D ground truth X Y Z into range (R), bearing angle (B) and elevation angle (e) coordinates of the target 130 in the cued radar's ENU frame of reference 140. For the configuration shown in views 100 and 200, the target's bearing angle $\beta$ is shown with respect to North 160, but an alternative direction be referenced to any other coordinate axis as desired.

The noise generation block 270 further generates noisy surveillance radar measurements for range, bearing and elevation ($R_m$, $\beta_m$, $e_m$) using radar accuracy attributes provided by radar accuracy data structure 260. All radars provide noisy measurements of target position. This characteristic applies to all radars due to finite resolution capabilities among many other reasons. At this juncture, novel features of exemplary embodiments become apparent.

Noisy measurements can be produced by adding computed random noise errors ($\varepsilon_R$, $\varepsilon_\beta$, $\varepsilon_e$) to each of the above ground truth (R, $\beta$, e) values as follows:

$$R_m = R + \varepsilon_R,$$

$$\beta_m = \beta + \varepsilon_\beta,$$

$$\text{and } e_m = e + \varepsilon_e. \tag{1}$$

These errors have respective variances $$\left(\sigma_R^2, \sigma_\beta^2, \sigma_e^2\right)$$

and are supplied by the radar accuracy data structure 260 in response to an operator or computer selection of desired radar accuracy factors for ordered radar type.

One can simulate any search radar 120 of choice by selecting values for $$\left(\sigma_R^2, \sigma_\beta^2, \sigma_e^2\right)$$

appropriate for that particular variant together with other characteristics, such as:

(a) radar beam shape, and
(b) radar gain as a function of range, assuming these quantifiable parameters are available. The greater the number and sophistication of these characteristics that are modelled in exemplary embodiments simulation, the more realistic can be the resulting measurements errors to simulate the search radar 120. This remains valid even when that equipment is not physically at the test site. The properties of these radars will be available from manufacturers, government agencies or other authoritative sources.

The three quantities ($\varepsilon_R$, $\varepsilon_\beta$, $\varepsilon_e$) represent the Gaussian random errors in range, bearing and elevation measurements that always exist in radar measurements. These random errors are generated numerically in the simulation using the well-known Box-Muller transformation by G. E. P. Box and M. E. Muller, "A Note on the Generation of Random Normal Deviates" *Ann. Math. Statis.* 29 (2) June 1958 (available at https://projecteuclid.org/journals/annals-of-mathematical-statistics/volume-29/issue-2/A-Note-on-the-Generation-of-Random-Normal-Deviates/10.1214/aoms/1177706645.full—see also S. Blackman, *Multiple-Target Tracking with Radar Applications* 1986, p. 215).

As shown in view 200, these noisy measurements form the cueing coordinates 280 directing the cued radar 110 to slew its antenna to bearing and elevation angles ($\beta_m$, $e_m$), respectively, and to search for a target 130 at a radial distance ($R_m$) in that vicinity. Exemplary embodiments disclosed herein enable operators to test, using an active target 130, how well the cued radar 110 performs in real time using cues 280 from a selection of different search radars 120 that may not all be present at the test site. By comparing performance metrics from the cued radar 110 based on live data that contain cueing data errors modeled on each of the search radars 120, one can assess and compare the capacity of the cued radar 110 to acquire targets based on the varying quality of radar data produced by each candidate search radar 120.

Exemplary embodiments can incorporate a graphical user interface (GUI) used to enable operator selection of the radar types to instance, the systems of coordinates to use, and the data rates. This can be expanded to enable entry of multiple subscribers for radar data and other properties. Similarly, an application Interface can be developed for automated processes that interact with exemplary embodiments. View 200 omits noisy elevation angle measurement ($e_m$) for clarity. The cueing of and tracking by the FC radar 110 is evolving in time and both the target 130 and FC radar 110 can be in motion.

FIG. 3 shows a geometric view 300 of position of the target 130 within a three-dimensional ENU frame of reference 310 relative to the cued radar 110. The cueing radar 110 has an origin 320 from which a position vector 330 points to the target 130 with the vector length equal to the slant range (R) of the target from the cued radar 110 and bearing direction ($\beta$) to the target 130 in the horizontal plane tangent to the frame's origin 320 and elevation direction (e) relative to this same horizontal plane.

The conversion from this spherical vector representation into the rectangular coordinate representation (X Y Z) form of the vector 330 is also shown with trace position 340. The vector 330 has the trace shadow vector 350 onto the horizontal plane 140 from the origin 320 with the vector length equal to the horizontal range ($\rho$) of the target 130.

Figure 4:
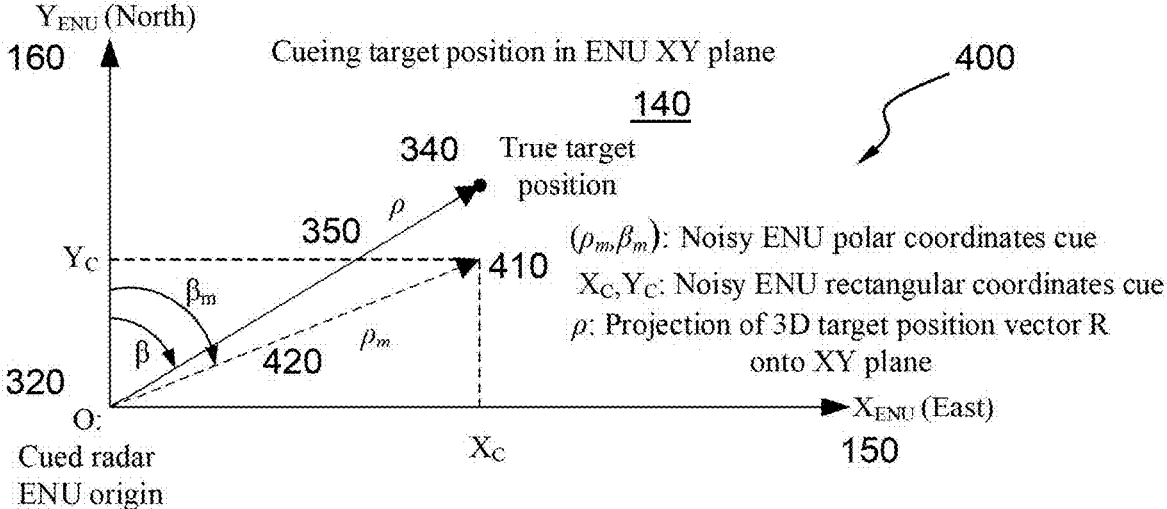
FIG. 4 is a geometric view of a planar reference frame.

FIG. 4 shows a geometric view 400 of position of the target 130 in the ENU frame of reference 140 in a two-dimensional (2D) plane with both the ground truth target position vector 350 and the target position vector 420 after noising the data using the exemplary system 240. The cued radar 110 provides the frame's origin 320 with orthogonal axes ($X_{ENU}$, $Y_{ENU}$).

The target's coordinates (R, $\beta$) correspond to its true position 340 (in the 2D plane) with the corresponding ground truth radial position vector 350 from the origin 320. The target's noisy measurement position vector 420 ($\rho_m$, $\beta_m$) illustrates the output of process 240 after operating on ground truth position vector 350 including the corresponding rectangular coordinates, $X_C$ and $Y_C$. This process evolves in time, and both the target 130 and radar 110 can be in motion.

One introduces errors to these (R, $\beta$, e) coordinates to provide noisy measurements ($R_m$, $\beta_m$, $e_m$) for simulating noisy measurement coordinates from the radar, which has inherent accuracy limitations. These errors have variances $$\left(\sigma_R^2, \sigma_\beta^2, \sigma_e^2\right)$$

whose values are set to those of the search radar 120 to generate radar representative measurements against the practice target 130.

This aspect provides an important capability from exemplary embodiments. One can simulate any search radar 120 of choice by selecting values for $$\left(\sigma_R^2, \sigma_\beta^2, \sigma_e^2\right)$$

appropriate for that particular configuration, together with other characteristics of that radar, assuming their availability. Greater sophistication of these characteristics can yield more realistic measurement errors. This, of course, remains valid, even when the search radar 120 is physically absent from the origin 320.

In this instance, these induced noisy ($R_m$, $\beta_m$, $e_m$) range and angle measurements are introduced to the cued radar 110 to provide its pointing directions, or cues 280, to where for directing the radar's search beam to secure the next contact data on the target 130. The cues 280 can also be provided in noisy ENU rectangular frame of reference 140 coordinates by conversion to $X_C$, $Y_C$ and $Z_C$ coordinates as determined from the range and angle values:

$$X_C = R_m \sin(\beta_m) \cos(e_m),$$

$$Y_C = R_m \cos(\beta_m) \cos(e_m),$$

$$\text{and } Z_C = R_m \sin(e_m). \tag{2}$$

Figure 5:
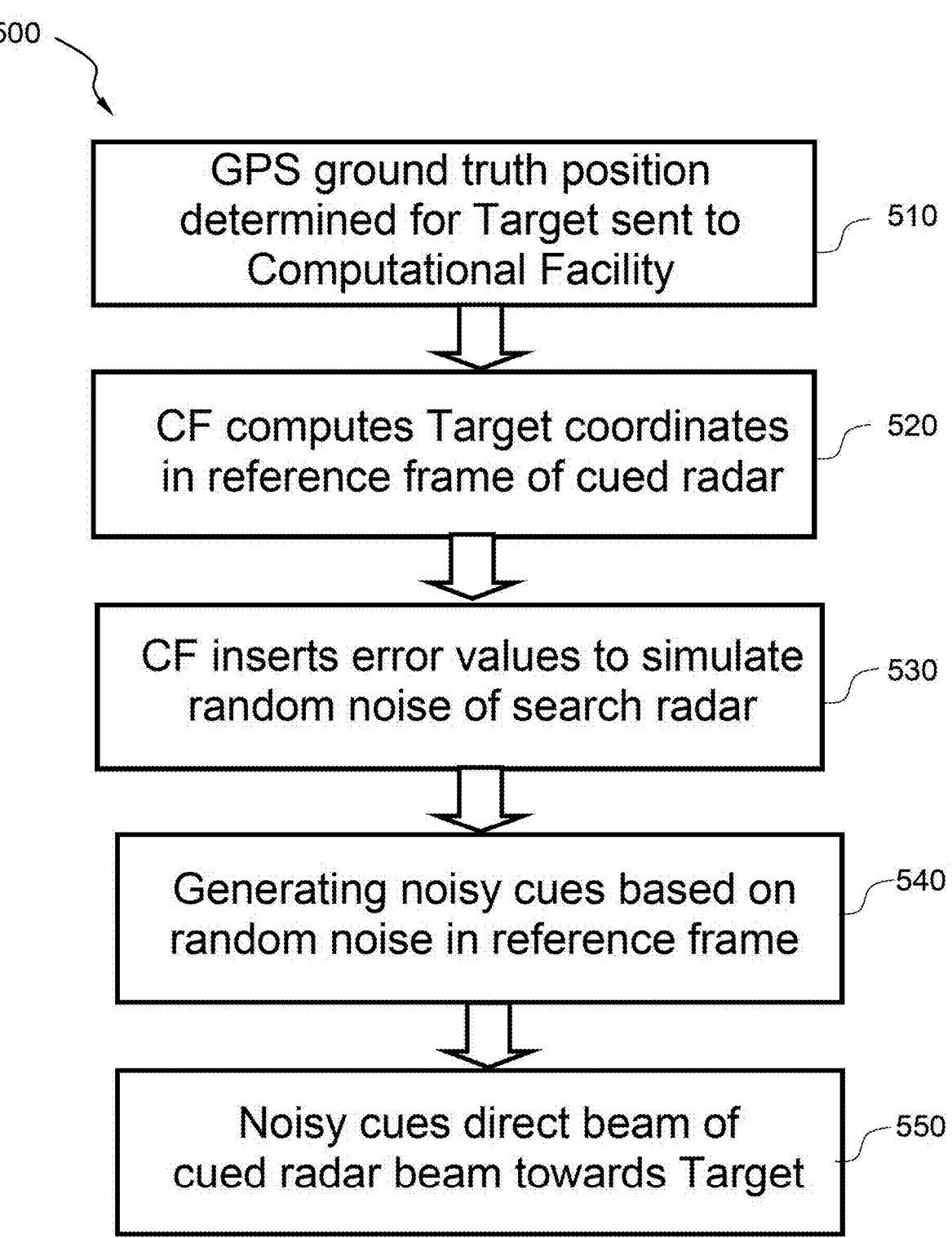
FIG. 5 is a flowchart view of operations for cuing the radar.

FIG. 5 presents a flowchart view 500 of a method to provide noisy targeting information to a cued radar 110. The process begins with a first operation 510 in which GPS provides ground truth position of the target 130 to the CF 210. In the second operation 520, the CF 210 computes 250 true target coordinates in the cuing radar's ENU frame of reference 140. This proceeds to a third operation 530 for setting the basis of modeling accuracy 260 through radar accuracy statistics $$\left(\sigma_R^2, \sigma_\beta^2, \sigma_e^2\right).$$

The process continues to a fourth operation 540 for generating 270 noisy target cues 280 in the ENU frame of reference 140 (or alternative North-East-Down or NED) using the selected coordinates, and submitting these to the cued radar 110. A Gaussian measurement error calculation technique is used. Finally in a fifth operation 550, the cued radar 110 points a search beam towards the target 130 in its ENU frame of reference 140 to a search radar 120 using target cues 280 to compensate for the search radar's constraints. Covariance matrices enable transformation from ENU to NED frames of reference as an additional option.

Section III: Mathematical Equations—The underlying mathematical operations are explained herein for operations described in view 500. The first involves computation of true X Y Z target coordinates in cued radar ENU frame of reference 140. These are well-known being available in numerous textbooks e.g., such as chapter 12 of Y. Bar-Shalom et al., Estimation with Applications to Tracking and Navigation, (available at https://annas-archive.org/scidb/10.1002/0471221279.ch12?scidb_verified=1) John Wiley, 2001.

Target coordinate determination involves the following operations: (i) target ground truth latitude, longitude and altitude geodetic coordinates obtained from GNSS are represented by ($\varphi_t$, $\lambda_s$, $h_s$).

(ii) the cued radar's ground truth latitude, longitude and altitude geodetic coordinates obtained from GNSS are represented by ($p_s$, $\lambda_s$, $h_s$).

(iii) altitude parameters $h_t$ and $h_s$ share units with parameter a as earth's average radius, in this case meters (m).

(iv) convert target and cued radar geodetic coordinates to Earth-Centered-Earth-Fixed (ECEF) coordinates.

(v) calculate target X Y Z coordinates to cued radar's ENU frame of reference 140 using target and cued radar ECEF coordinates.

Earth-Centered-Earth-Fixed (ECEF) target coordinates (subscript t) are given by:

$$\begin{bmatrix} x_t \\ y_t \\ z_t \end{bmatrix}_E = \begin{bmatrix} (N_t + h_t)\cos(\varphi_t)\cos(\lambda_t) \\ (N_t + h_t)\cos(\varphi_t)\sin(\lambda_t) \\ ((1 - e^2)N_t + h_t)\sin(\varphi_t) \end{bmatrix}, \tag{3}$$

where $N_t$ is earth's radius at target's surface intercept 340, $$N_t = \frac{a}{\sqrt{1 - e^2\sin^2(\varphi_t)}}, \tag{4}$$

such that radius a=6,378,137 meters and eccentricity $e^2$=0.00669437999013.

Similarly, the ECEF coordinates of the origin 320 of the cued radar's ENU frame of reference 140 (subscript s) are given by:

$$\begin{bmatrix} x_s \\ y_s \\ z_s \end{bmatrix}_E = \begin{bmatrix} (N_s + h_s)\cos(\varphi_s)\cos(\lambda_s) \\ (N_s + h_s)\cos(\varphi_s)\sin(\lambda_s) \\ ((1 - e^2)N_s + h_s)\sin(\varphi_s) \end{bmatrix}, \tag{5}$$

where $N_s$ is earth's radius at the reference frame's origin 320, $$N_s = \frac{a}{\sqrt{1 - e^2\sin^2(\varphi_s)}}. \tag{6}$$

The target X Y Z coordinates in the cued radar's ENU frame of reference 140 are given by Bar-Shalom as:

$$\begin{bmatrix} x_t \\ y_t \\ z_t \end{bmatrix}_{ENU} = \begin{bmatrix} -\sin(\lambda_s) & \cos(\lambda_s) & 0 \\ -\sin(\varphi_s)\cos(\lambda_s) & \sin\varphi_s\sin(\lambda_s) & \cos(\varphi_s) \\ \cos(\varphi_s)\cos(\lambda_s) & \cos\varphi_s\sin(\lambda_s) & \sin(\varphi_s) \end{bmatrix} \left\{ \begin{bmatrix} x_t \\ y_t \\ z_t \end{bmatrix}_E - \begin{bmatrix} x_s \\ y_s \\ z_s \end{bmatrix}_E \right\}. \tag{7}$$

The coordinates on the left in eqn. (7), because they are generated using GNSS data, provide the ground truth coordinates of the target 130 in the cued radar's ENU frame of reference 140.

The noise generation block 270 generates noisy ($R_m$, $\beta_m$, $e_m$) target cues 280 of the target's position for the cued radar 110 as the next task. These cues can be available in both spherical coordinates (R, β, e) as well as in rectangular coordinates (X,Y,Z) in the ENU frame of reference 140. Two methods are presented for ENU spherical coordinates ($R_m$, $\beta_m$, $e_m$) and ENU rectangular coordinates ($X_C$, $Y_C$, $Z_C$).

Method 1: Cueing in ENU ($R_m$, $\beta_m$, $e_m$) coordinates involves providing the target's ground truth range, bearing, and elevation (R, β, e) in the cued radar's ENU frame of reference 140. To these coordinate values, zero mean Gaussian noisy measurement errors are incorporated to the ground truth range, bearing and elevation angles to generate noisy ($R_m$, $\beta_m$, $e_m$) cues 280 using values for the three error term parameters $$(\sigma_R^2, \sigma_\beta^2, \sigma_e^2)$$

that characterize performance of the search radar 120 under evaluation. Ground truth target coordinates ($x_t$, $y_t$, $z_t$) convert the target's coordinates in the cued radar's ENU frame of reference 140 into spherical coordinates (R,β,e).

The target's ground truth range is provided by:

$$R = \sqrt{x_t^2 + y_t^2 + z_t^2}. \tag{8}$$

Target ground truth bearing angle β is computed in the typical manner using any well-known mathematical technique. The two-parameter inverse tangent function is typically uses:

$$\beta = \arctan 2(x_t, y_t). \tag{9}$$

The bearing angle β is defined to be with respect to the North (Y) axis 160. However, this can alternatively be with respect to another axis for different circumstances. Finally, the elevation angle e is computed from:

$$e = \tan^{-1}\left(\frac{z_t}{\sqrt{x_t^2 + y_t^2}}\right). \tag{10}$$

The noisy generation block 270 adds errors to these ground truth spherical (R, β, e) values to simulate cueing limitations. One technique for producing random noise is the probability distribution function (PDF). The radar measurement error variances $$(\sigma_R^2, \sigma_\beta^2, \sigma_e^2)$$

from the search radar 120 under simulation generate random extractions from Gaussian PDFs with such statistics.

These Gaussian measurement errors enable the noisy generation block 270 to provide noisy spherical ($R_m$, $\beta_m$, $e_m$) cues 280. The covariance matrix $P_{R\beta e}$ associated with coordinates ($R_m$, $\beta_m$, $e_m$) is given by arranging these variances in tri-diagonal form as:

$$P_{R\beta e} = \begin{bmatrix} \sigma_R^2 & 0 & 0 \\ 0 & \sigma_\beta^2 & 0 \\ 0 & 0 & \sigma_e^2 \end{bmatrix}. \tag{11}$$

The quantities (ρ, $\rho_m$) in view 400 represent the projections onto the cued radar's XY ENU plane of the ground truth and noisy measured target 3D position vectors (R, $R_m$), respectively. The target's noisy ($R_m$, $\beta_m$, $e_m$) coordinates are determined in the cued radar's ENU frame of reference 140.

Method 2: Cueing in noisy XYZ ENU rectangular frame of reference by converting noisy spherical coordinates ($R_m$, $\beta_m$, $e_m$) into equivalent noisy $X_C$, $Y_C$ and $Z_C$ coordinates. These noisy target cues 280 ($X_C$, $Y_C$, $Z_C$) in the cued radar's ENU frame of reference 140 are given by eqn. (12):

$$X_C = R_m \sin(\beta_m) \cos(e_m),$$

$$Y_C = R_m \cos(\beta_m) \cos(e_m),$$

and $Z_C = R_m \sin(e_m)$.　　　　　　　　　　　　　　(12)

The covariance matrix $P_{R\beta e}$ of cues 280 ($X_C$, $Y_C$, $Z_C$) from eqn. (11) with respect to the ENU frame of reference 140 is given by Blackman:

$$P_{X_C Y_C Z_{C_{ENU}}} = A_W P_{R\beta e} A_W^T,$$ 　　(13)

where the covariance matrix $P_{R\beta e}$ is given in eqn. (11) and measurement translation matrix $A_w$ is:

$$A_W = \begin{bmatrix} \sin(\beta_m)\cos(e_m) & R_m\cos(\beta_m)\cos(e_m) & -R_m\sin(\beta_m)\sin(e_m) \\ \cos(\beta_m)\cos(e_m) & -R_m\sin(\beta_m)\cos(e_m) & -R_m\cos(\beta_m)\sin(e_m) \\ \sin(e_m) & 0 & R_m\cos(e_m) \end{bmatrix},$$ 　(14)

with superscript T denoting its matrix transpose.

The noisy (rectangular) cue coordinates and their associated covariance matrix $P_{R\beta e}$ in the cued radar's ENU frame of reference 140 can be converted to alternate reference frames. Some cued radars 110 may require the cue coordinates in the North-East-Down (NED) frame of reference. This involves a simple transformation from the ENU frame to the NED frame that would be well-known to anyone of ordinary skill in the art.

The cued rectangular coordinates in the NED frame of reference are given by:

$$\begin{bmatrix} X_C \\ Y_C \\ Z_C \end{bmatrix}_{NED} = \begin{bmatrix} 0 & 1 & 0 \\ 1 & 0 & 0 \\ 0 & 0 & -1 \end{bmatrix} \begin{bmatrix} X_C \\ Y_C \\ Z_C \end{bmatrix}_{ENU} = T_C \begin{bmatrix} X_C \\ Y_C \\ Z_C \end{bmatrix}_{ENU},$$ 　(15)

where transform matrix $T_C$ from ENU to NED is:

$$T_C = \begin{bmatrix} 0 & 1 & 0 \\ 1 & 0 & 0 \\ 0 & 0 & -1 \end{bmatrix},$$ 　(16)

and their associated NED covariance matrix is provided by:

$$P_{X_C Y_C Z_{C_{MED}}} = T_C P_{X_C Y_C Z_{C_{EMU}}} T_C^T.$$ 　(17)

This provides the (rectangular) cueing coordinates for ENU and associated 3×3 covariance matrix with respect to the cued radar's NED frame of reference.

Generating the above cueing coordinates remains compatible to the search radar 120 being co-located with the cued radar 110 for simplicity and convenience. However, the search radar 120 can be disposed at any arbitrary displacement from the cued radar 110 with a minor change to the relations that would be well within the capability of an artisan of ordinary skill. This involves a simple conversion to coordinate-transform data of the search radar 120 into the cued radar's ENU frame of reference 140.

Section IV: Benefits—Although the previous description relates to search radar simulation generating target cues for the FC radar 110, the ability to generate representative radar measurements such as those for search radar 120 has other functions to which exemplary embodiments is just as applicable including the following possible conditions.

Proposed costly radars can be tried using exemplary embodiments before investing resources in building the physical system. Such systems using embedded radar-aided control such as autonomous vehicles can apply exemplary embodiments to assess control algorithm logic for various radar types. Such embodiments can be used to simulate an adversary's or competitor's radar and then used to detect and track friendly or neutral vehicles, thereby predicting the likelihood of the trackability of friendly or neutral vehicles prior to their introduction into a hostile operational environment with an adversary's radar technology.

Track initiation, maintenance, ambiguity resolution, correlation, radar fusion and other similar software processes that incorporate radar data can be evaluated using a selection of different radars for research or product development purposes. Beneficiaries include commercial transportation industries, navigation system developers, non-military government agencies and military organizations. Fire control (FC) software processes related to multiple radar track filtering, kill assessment, and radar choice threshold analysis can be evaluated efficiently using exemplary embodiments.

Training for organizations whose core skills include situational awareness based on analysis of radar data to formulate courses of action, such as those in the military and commercial transportation, can apply exemplary embodiments for simulating scenarios. Tracking a surface target constitutes a significantly different problem from that of tracking an aerial target 130 at altitude. Exemplary embodiments offer the potential to selectively analyze and select a particular search radar-cued radar pair that offers the best performance metrics for specific tactical scenarios.

For example, the exemplary technique enables identifying the search radar/cued radar pair among several that offers the best performance metrics for a scenario comprising small high-speed surface craft. A separate pair of search radar 120 and cued radar 110 could offer the best performance against a large slower moving surface target such as a battle cruiser. In a similar manner when tracking an aerial target 130, there are a variety of different scenarios that can be evaluated, some of which are as follows:

(a) a high speed highly maneuverable air threat such as an air superiority fighter jet performing a variety of maneuvers such as dives, slide slips, and corkscrew motion.

(b) a large subsonic threat such as a military transport aircraft that alters altitude and course periodically.

(c) a slower-moving unmanned aerial vehicle.

(d) a threat having the capability to hover for a time interval and then suddenly start moving at subsonic speeds such as a military helicopter.

Tracking these different threat types involves selection of the best radar or radar set optimally suited for each type of threat. Exemplary embodiments enable analysis of each of several possible search radar-cued radar combinations to establish the most appropriate pair for handling each one of these scenarios. The above list of scenarios is not comprehensive. Many others scenarios exist, including for example tracking using sonar sensor data, and the most appropriate combination for handling these additional conditions can also be established with this exemplary technique. Exemplary embodiments are equally applicable to analyzing the standalone or combined target tracking performance of a wide variety of radars.

Section V: Example—During the summer of 2022 a ship-based fire control director was evaluated for possible use by the US Navy's Mark (MK) 160 Gun Computer System (GCS) at a test site supporting live waterborne vehicle use. Director is another term used for specialized fire control radars. The MK 160 GCS is the standard such instrument for the United States Navy, providing fire control for naval guns. The MK 160 GCS calculates gun position orders necessary for a fired projectile to intercept an engaged target being tracked by a ship's radar or other sensor system. Its core elements include a computer executing an operational computer program and a GUI console for an operator to direct its use. It has connections to gun mounts that fire various types of ammunition, and an optical system to provide visual clearance to fire. External systems provide supporting data to the MK 160 GCS.

For cases in the U.S. Navy, cueing data to the director, e.g., the CF 210, can be supplied by three different radar systems, each differing in accuracy and update rate. This requirement presented a serious impediment due to the impracticability and expense to procure and install, and operate the three physical radars at the test site Naval Surface Warfare Center.

The unattainability of procuring, installing and operating three physical search radars has inspired the idea for exemplary embodiments to simulate radar measurement data by modifying a stream of highly accurate, ideal, real-time target position measurement data with "noise" based on radar variance statistical data, and using the resulting radar characteristic noisy measurement data as the real-time designation data for director track acquisition of the target 130.

The term real-time is understood as the system under test can interpret and respond to the characteristic radar measurement data generated by exemplary embodiments analogous to when the physical radar is connected to the system under test. Exemplary embodiments described and implemented in the MK 160 GCS result from determining how to satisfy this requirement.

Section VI: Condition Description of a typical test experiment: The following is a brief description of how a typical live data collection experiment would proceed using exemplary embodiment techniques.

(1) Using the techniques set forth above, the noisy target coordinates in the cued radar's ENU frame 310 are computed in coordinates block 250 with each sample interval and the cued radar 110 points to the local volume in the vicinity of the target 130.

(2) When the cued radar 110 detects and tracks the target 130, one subsequently computes appropriate tracking and/or engagement metrics to determine how well the cued radar 110 performs its function based the cues 280.

(3) When this experiment is completed with the first search radar 120, one modifies the parameters in the search radar simulation to model the second search radar 120 for evaluation.

(4) The above steps are then repeated for the second search radar 120 and performance metrics are computed. A similar process was used with a third search radar 120.

Steps are also repeated when different types of trajectories are to be evaluated. For example, a high-performance fighter aircraft would present a markedly different trajectory and challenge to a tracking-and-engagement radar versus that of a slow-moving low-acceleration large transport aircraft.

Section VII: Operations—The following operations are used within various embodiments satisfy the requirement for formulating characteristic measurement data from multiple types of radars. These procedures include:

(A) instrumenting a target to receive GNSS data.

(B) convert GNSS data into target position information as measured relative to the application-specified frame of reference.

(C) gather selections of radar types, data output rate and systems of coordinate frames.

(D) obtain radar performance statistics to simulate as noise.

(E) incorporate noise into the position information.

(F) supply the noisy, radar representative measurement data to a service subscriber for simulating radar performance against the target.

Figure 6:
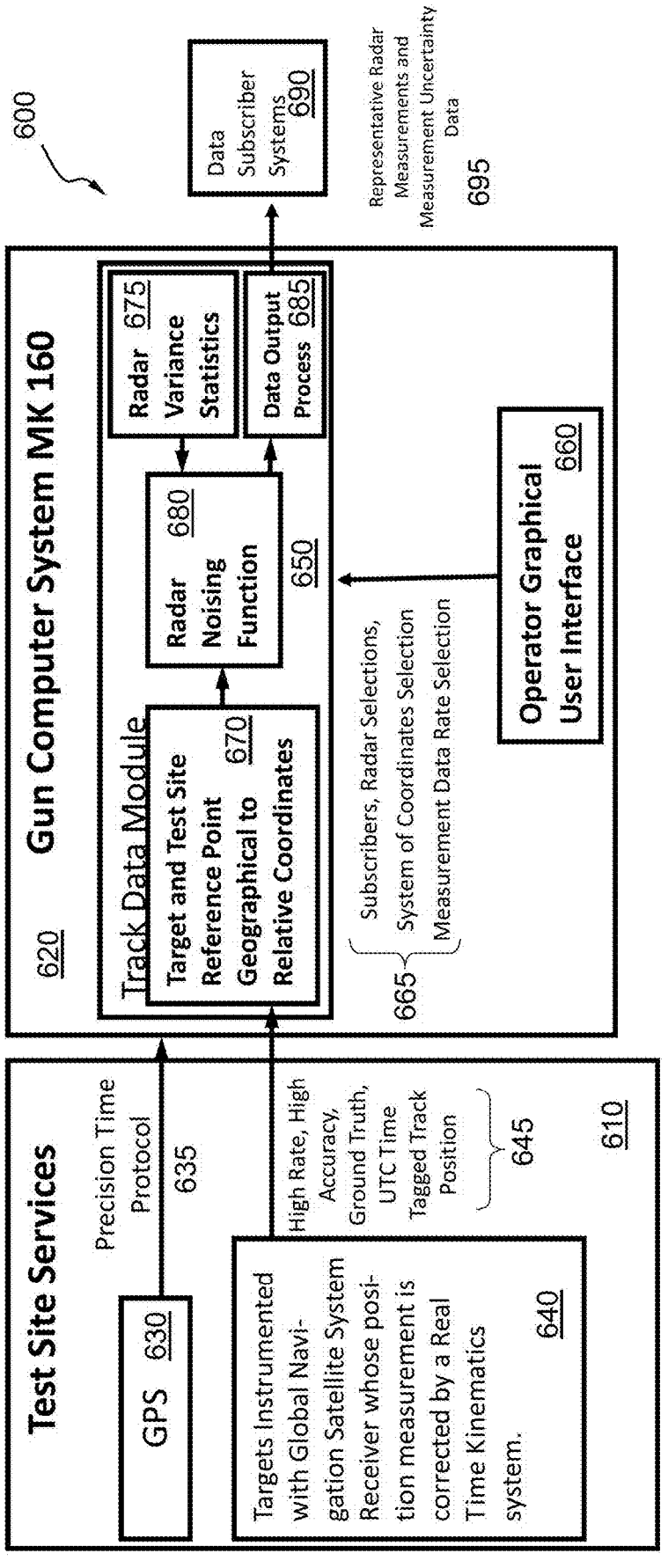
FIG. 6 is a block diagram view of communication between the test site and the MK 160 gun computer system.

FIG. 6 shows a block diagram view 600 of communication between the site 610 and a MK 160 GCS 620. The test site 610 provides commonly available information, such as UTC signals received from a GPS receiver 630 and distributed to participants using PTP 635 and GNSS receiver data 640 from the target 130 as UTC based high-rate high-accuracy ground truth position 645. The GCS 620 includes a track data module 650 that receives the PTP 635 and the GPS target instrumentation data stream, and an operator GUI 660 that provides selection information 665 to the module 650.

The module 650 contains a coordinate converter 670, radar variance statistics 675, a radar noising function 680 and a data output process 685. The converter translates target and test site reference points from geodetic to test site, and application-derived relative coordinates. The statistics 675 provide physical analogs to the function 680, which produces the output 685 as data subscription 690 for the cued radar 110. These cues 280 represent measurement uncertainty 695 of the physical radar to be simulated, such as a search radar 120. Note that the radar noising function 680 operates separately from in the target data stream, or conversion of geodetic coordinates.

Figure 7:
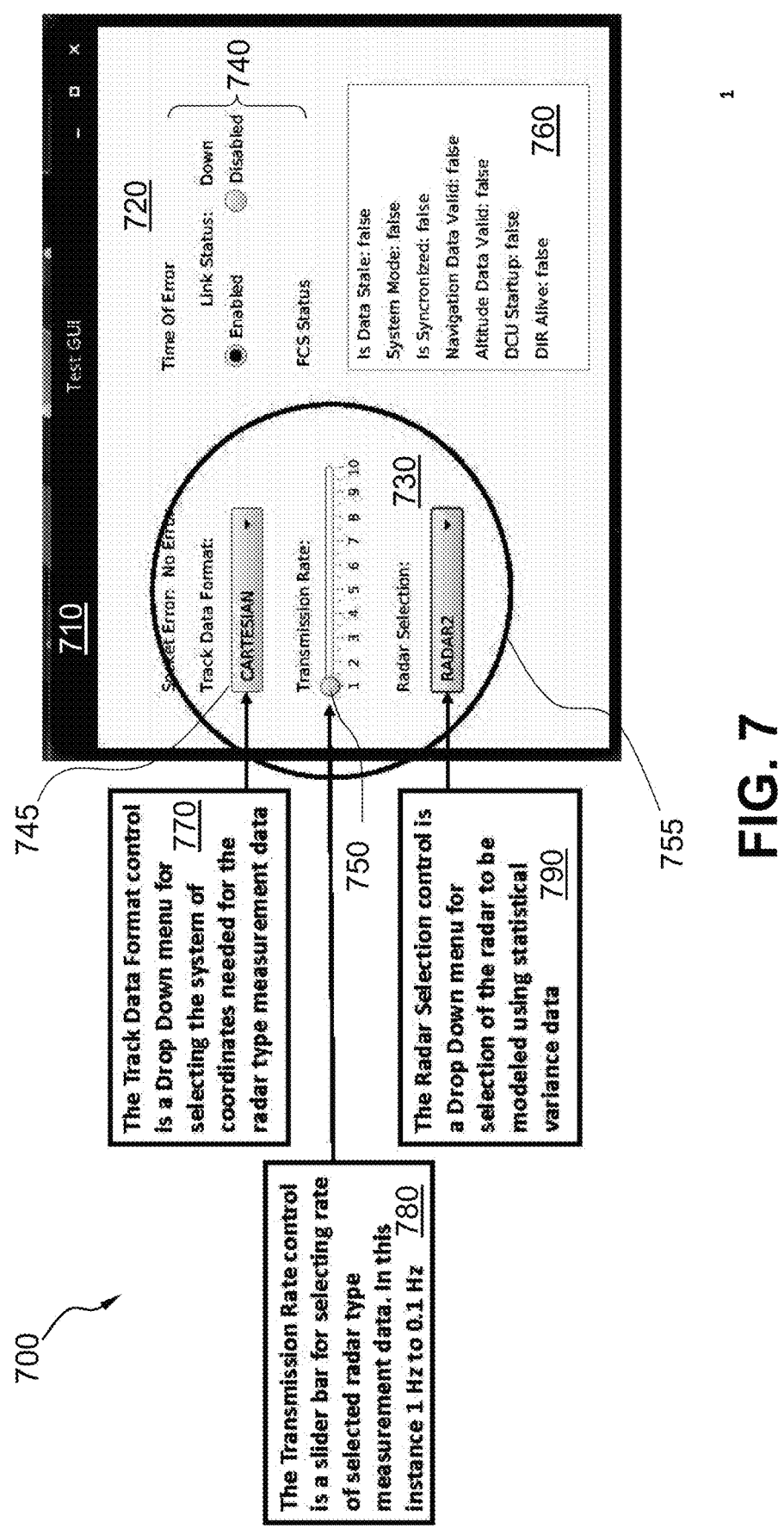
FIG. 7 is a block diagram view of an optional test GUI.

FIG. 7 shows a block diagram view 700 of an example test GUI 710, including a screen panel 720. Left and right selection portions 730 and 740 are displayed on the panel 720. The left portion 730 includes a coordinate system selection option 745, a transmission rate selection slider bar 750, and a type selection of radar 120 for simulation 755. The right portion 740 contains controls to reset communication between MK 160 CGS 620 and the director. An FCS status 760 contains operational readiness related status data. The desired system of coordinates option 745 is implemented based on track data format 770 as a drop down menu. The rate slider 750 permits selection control 780 across a range from 1 Hz to 0.1 Hz in frequency. The radar selection control 790 presents a drop down menu for radar selection that drives usage of radar-specific variance data. Similar selections can be conducted by an automated process within the scope of exemplary embodiments, as understood by artisans of ordinary skill.

The sequence of operations involved in producing radar representative measurements is presented as follows. These operations are listed as (A) instrumentation, (B) coordinate conversion, (C) option selection, (D) signal retrieval, (E) noise insertion to signal, and (F) modified signal output.

A. First, instrument active or live targets 130 using an emerging technology service 640 widely available at leading test ranges. This service employs GNSS equipment using a local correction service to increase the accuracy of the satellite-derived position measurement data. During evaluation of exemplary embodiments, the active target 130 used for testing and receiving corrections was equipped as a "Rover" station using a Novatel GNSS receiver that obtained corrections to its satellite-measurement position from a real-time kinematic (RTK) "Base" station.

The result was an extremely accurate position that supported updates each tenth of a second. These ground truth position measurements 230 of the live target 130 were UTC time-stamped and broadcast from the target 130 to an exemplary CF 210 in real-time. These exemplary embodiments do not depend on RTK specific correction service; instead, other GNSS correction services could also have been used such as Differential GPS. The stream of nearly perfect ground truth data fed and enabled the exemplary "noising" process that altered the ground truth data so as appearing to originate from ship-board surveillance radar 120.

B. Second, feed the GNSS corrected target data stream 645 through a coordinate conversion process 670. This converts the geodetic coordinates and altitude of the live target position as well as geodetic coordinates and altitude of a selected data reference point (e.g., the test site) to generate target ground truth position measurement data relative to that selected data reference point as the origin 320. This exemplary technique is described in operation 520 of Section III. Exemplary embodiments as initially designed receive GNSS data from two targets, but in principle, this limitation can be expanded.

C. Third, gather selections from an optional GUI 710 in which an operator has options to select (1) radar types 790, (2) the data rate 780 of the radar data to be output to subscriber systems, and (3) the system of coordinates 770 used by the radar including options for spherical and rectangular coordinates. Any additional numbers of radars could have been listed on the GUI and the supplied data rate selection technique shown as slider bar 750 could be modified to accommodate any data rate. Groups of radar types could also be selectable with a simple expansion of the basic process. Similar selections can be produced by a computer automated process in accordance with exemplary embodiments.

D. Fourth, retrieve radar statistics 675 for usage in the data noising process for the operator selected radar type. Performance statistics are available from radar manufacturers, radar program offices, or other authoritative sources. Originally, measurement variance and data rate statistics have been used but this could easily be expanded to include other measurement performance drivers such as specific modes of operation.

E. Fifth, introduce noise into the ground truth data 680 using the exemplary techniques shown in Section III. This employs the radar variation statistical data, and random number generation to produce an error to add to the ground truth data to generate a noisy radar-characteristic sensor measurement. Further, calculate the error covariance matrix associated with the noisy measurement. The measurement and covariance matrices are consistent with those produced by the physical radar. The mathematics (algorithm) used in this operation present an original aspect to exemplary embodiments.

F. Finally, output the noisy measurement data and uncertainty data to service subscriber systems. Note the system as initially designed only requires the output of one selected radar source to a single subscriber system at a time, but could inherently accommodate output of many different radar streams at the same time to multiple subscribers, which can implement this simulation information for custom radar evaluations.

The primary advantage from these embodiments is ability to perform active target tracking testing and data collection that require, land-, sea- and air-based radar measurement data in environments where physical radar presence is not possible. Exemplary embodiments support a broad array of applications involving any activity requiring characteristic radar measurement data.

In the military domain, projects can evaluate command and control track process functions such as track initiation, track correlation, and ambiguity resolution. Additionally, projects can evaluate fire control functions such as filtering, tactics application, and weapon control. Advanced track processing techniques can evaluate sensor fusion algorithms with many different radar types while actively seeking multiple targets, and with data sent to many operators. Further, such efforts can be expanded to incorporate pitch, roll and yaw motions in simulated sensors.

In other federal domains such as air traffic control, projects may evaluate radar measurement data to facilitate safe airport approaches and departures. Any academic institution involved in the research of radar technology might also benefit from exemplary embodiments. Additionally, such embodiments could also be expanded to other domains using technologies analogous to radar such as sonar.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented radar simulation method for directing a radar beam to a target, said method comprising:
   receiving target position from the target;
   computing target coordinates in a select frame of reference;
   inserting random noise error into said target coordinates as accuracy degradation to represent at least one radar performance characteristic;
   providing said accuracy degradation into said frame of reference; and
   directing the radar beam using said accuracy degradation towards the target.

2. The method according to claim 1, wherein said target position originates from global positioning system (GPS) reception as geodetic coordinates.

3. The method according to claim 1, wherein said performance characteristic is selected among radar type, data rate, and system of coordinates.

4. The method according to claim 1, wherein said frame of reference has an origin at the radar.

5. The method according to claim 1, wherein said frame of reference is oriented east-north-up (ENU) rectangular coordinates.

6. The method according to claim 5, wherein said frame of reference is translated from ENU to north-east-down (NED) rectangular coordinates.

7. The method according to claim 1, wherein said frame of reference is oriented east-north-up (ENU) spherical coordinates.

8. The method according to claim 7, wherein said frame of reference is translated from ENU to north-east-down (NED) spherical coordinates.

9. An automation processor for modifying positional information of a target for a test radar that directs a beam towards said target to simulate a non-test radar that has at least one performance characteristic, said processor including:
   a receiver for receiving the positional information of the target;

a converter for converting the positional information into reference frame coordinates selected for the test radar;

an error generator for producing accuracy degradation comprising Gaussian noise based on the performance characteristic;

a signal integrator for integrating said accuracy degradation to said reference frame coordinates as noisy coordinates; and a transmitter for submitting said noisy coordinates to the test radar for directing the radar beam.

10. The processor according to claim 9, wherein said receiver receives the positional information from the test radar to establish said reference frame coordinates.

11. The processor according to claim 9, wherein said positional information derives from geodetic coordinates transmitted from the target.

12. The processor according to claim 11, wherein said geodetic coordinates are provided from Global Navigation Satellite System.

13. The process according to claim 9, wherein said frame of reference has an origin at the test radar.

14. The processor according to claim 9, wherein the performance characteristic is selected among radar type, data rate, and system of coordinates.

15. The processor according to claim 9, wherein said frame of reference is oriented east-north-up (ENU) rectangular coordinates.

16. The processor according to claim 15, wherein said frame of reference is translated from ENU to north-east-down (NED) rectangular coordinates.

17. The processor according to claim 9, wherein said frame of reference is oriented east-north-up (ENU) spherical coordinates.

18. The processor according to claim 17, wherein said frame of reference is translated from ENU to north-east-down (NED) spherical coordinates.

\* \* \* \* \*